United States Patent

Hoyler

[15] 3,691,368

[45] Sept. 12, 1972

[54] VEHICLE DETECTION SYSTEM AND METHOD

[72] Inventor: Robert C. Hoyler, Pittsburgh, Pa.

[73] Assignee: Westinghouse Electric Corporation, Pittsburgh, Pa.

[22] Filed: Dec. 3, 1970

[21] Appl. No.: 94,845

[52] U.S. Cl. ...............................246/29 R, 246/63 A
[51] Int. Cl. ...............................................B61l 21/06
[58] Field of Search............246/29 R, 77, 63 A, 28 R

[56] References Cited

UNITED STATES PATENTS 2,030,924   2/1936   Kemmerer...........246/29 R X

*Primary Examiner*—Gerald M. Forlenza
*Assistant Examiner*—George H. Libman
*Attorney*—F. H. Henson and R. G. Brodahl

[57] ABSTRACT

A vehicle to be detected is moved along a track divided into a plurality of sections, with a boundary between each adjacent pairs of sections. A radiant energy transmitter is situated at one side of the track at each such boundary, and a radiant energy receiver is situated on the other side of the track for receiving the transmitted radiant energy. The passing of a train through a boundary blocks the transmission of the radiant energy from the transmitter to the latter receiver. A radio (high frequency) signal receiving means is situated at each boundary adjacent the radiant energy receiver, for receiving a radio signal from a train carried antenna each time a train passes the boundary. In response to the sensing of radiant energy at a given boundary, concurrent with the reception of a radio signal from a given train passing the succeeding boundary, a signal is generated for controlling the speed of another train in at least the section preceding the given boundary.

5 Claims, 5 Drawing Figures

3,691,368

ND METHOD

VEHICLE DETECTION SYSTEM AND METHOD

CROSS REFERENCE TO RELATED APPLICATIONS

Ser. No. U.S. Pat. No. 3,600,604 filed Dec. 3, 1968 by G.M. Thorne-Booth and entitled "Failsafe Logic Gates". U.S. Pat. 3,551,889, filed May, 11, 1967 by C. S. Miller and entitled "Remote Signaling of Control Signals." Each of the above-named patents are assigned to the assignee of the present invention.

SUMMARY OF THE INVENTION

A vehicle position detection system is provided, wherein the path taken by a vehicle moving along that path is divided into a predetermined number of sections, including a defined boundary between each pair of adjacent sections. The vehicle moving along the track path carries a radio signal transmitting apparatus. In addition a radiant energy transmitting device is situated at each defined boundary on one side of the path and a cooperative radiant energy sensing device is situated at each boundary on the other side of the same path. A radio signal receiving apparatus is situated adjacent each radiant energy sensing device for sensing a radio signal transmitted by each passing vehicle. There are means responsive to the sensing of radiant energy at a given defined boundary concurrent with the sensing of a radio signal as transmitted from a vehicle antenna and by the signal receiving apparatus situated at the succeeding defined boundary for providing a control signal to determine the entry of a second vehicle into the path section containing the first vehicle.

BACKGROUND OF THE INVENTION

There are a number of known vehicle position detection systems in the teachings of the prior art. It is generally desired in all such systems that a component failure does not cause the provision of an erroneous signal which may result in a vehicle becoming involved in an accident.

In a moving vehicle system and particularly in such a system where a rubber tired vehicle is used, the track can be divided into a plurality of discrete signal control sections, and an antenna provided adjacent to and parallel with each such control section or alternatively a loop antenna can surround a given control section. Communication to and from a moving vehicle is via the antenna carried by that vehicle. The resulting vehicle position detecting system is relatively expensive, due to the necessity of running long lengths of antenna. Further, since all detection of and communication with a train is via the antenna along the track, a failure in the transmitting or receiving apparatus carried by the train vehicle, or a failure of the cooperative trackside antenna, can result in incorrect vehicle position signal indications.

In a moving vehicle system and particularly in such a system where steel rails are used, transmission of control signals indicative of block or section vehicle occupancy can be via the rails and dependent upon whether or not transmission along a given control section of rail has been interrupted by the presence of a vehicle shorting out the position detection signal transmission from that given section.

In each of the above systems there is but one signal transmission path to indicate block occupancy, resulting in a high chance of system failure in this regard.

The present invention provides a vehicle position detection system wherein a first signal path is provided for sensing that a vehicle is entering a given control section of track, and a second signal path is provided for sensing that a vehicle is leaving that given control section of track.

The present invention provides a vehicle position detection system wherein first and second signal sensing apparatus are operative with and situated adjacent to the defined boundary of each control section rather than along the entire length of the control section as was done in the above mentioned prior art systems.

DESCRIPTION OF THE DRAWINGS

FIG. 2b is a waveform relationship illustration helpful in the understanding of FIG. 2a.

DETAILED DESCRIPTION OF THE PREFERRED EMBODIMENT

Figure 1:
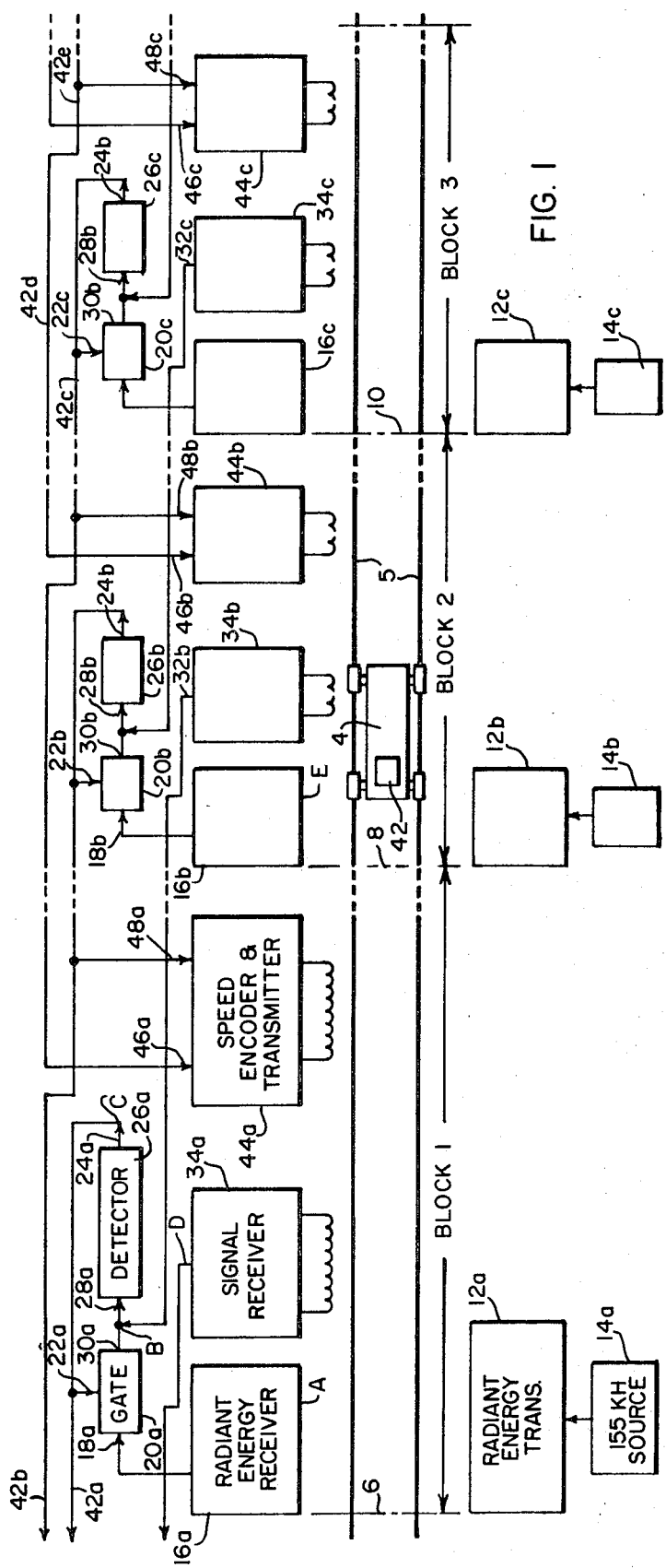
FIG. 1 is a system block diagram embodying the teachings of the present invention.

FIG. 1 is a system block diagram of a vehicle detection system wherein a vehicle such as a train unit 4 traverses a path, such as the track 5, which path is divided into a predetermined number of control sections or blocks such as the blocks 1, 2 and 3, as illustrated in FIG. 1. In actual practice there could be N blocks for a given length of track 5. Each control section or block is defined by a boundary between each such section, such as the boundary 6 at the beginning of block 1, the boundary 8 between blocks 1 and 2, and the boundary 10 between the blocks 2 and 3. These boundaries are theoretical and imaginary dividing points determined by how long the control system designer wishes to make each control block section. In no way are these boundaries to be construed as some type of solid or physically conductive rail or other apparatus to actually define physical boundaries between the respective control sections.

In each control block substantially identical apparatus is used, therefore like apparatus shown in FIG. 1 is given like reference numerals, with the like apparatus in control blocks 1, 2 and 3 having the subscripts *a*, *b* and *c*, respectively. The apparatus in control block 1 is to be described with the understanding that the apparatus in control blocks 2 and 3 operate in a similar manner.

Adjacent each boundary there is a signal source or radiant energy transmitting apparatus such as the transmitter 12a situated as shown on one side of control block 1 adjacent the boundary 6. A suitable source of radio frequency energy such as the 155 kilocycle source 14a transmits radio waves to modulate the radiant energy transmitted by the transmitter 12a. The source of radiant energy may be infrared energy, a laser, radar, or any source of energy which is blocked or absorbed by a solid object such as the vehicle 4. On the opposite side of the track 5 there is a cooperative signal receiving means, such as the radio receiver shown as radiant energy receiver 16a. During the absence of a vehicle 4 between the transmitter 12a and the receiver 16a, the radiant energy receiver 16a receives from the transmitter 12a the radiant energy wave and demodulates it to produce a 155 kilocycle signal at the output of the radiant energy receiver 16a.

Figure 2A:
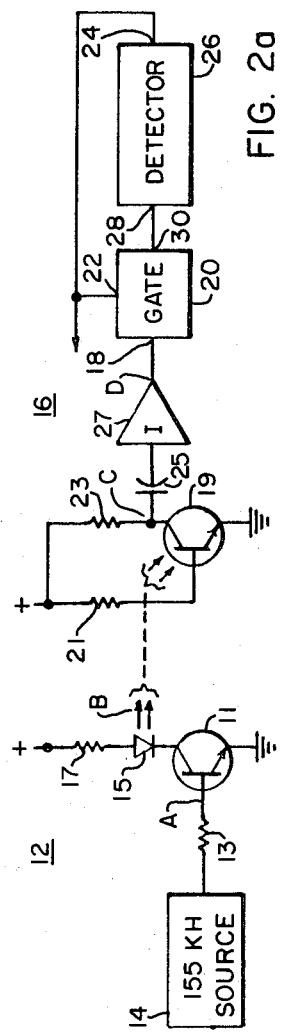
FIG. 2a is a schematic of the radiant energy transmitter and receiver generally illustrated in FIG. 1.

In FIG. 2a there is shown a schematic illustration of a typical one of many suitable radiant energy transmitting devices 12 and radiant energy receiving devices 16 that may be used in the practice of the present invention.

The transmitting device 12 comprises a transistor 11 having its emitter connected to ground and its base connected to the 155 KC signal source 14 through a resistor 13. The collector of the transistor 13 is connected to a positive (+) voltage source of operating potential through an infrared light emitting diode 15 and a resistor 17.

The receiving and demodulating device 16 comprises a phototransistor 19 having its emitter connected to ground and its base connected to a positive (+) voltage source of operating potential through a biasing resistor 21. The collector of transistor 19 is connected to the positive (+) voltage source through a load resistor 23 and is connected to the input of an inverter 27 through a coupling capacitor 25. The output of the inverter 27 is connected to the input 18 of the signal gate 20.

Figure 2B:
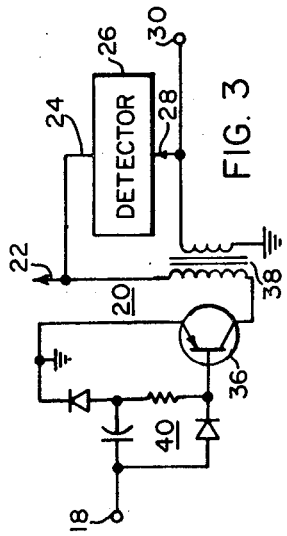

There is applied a 155 kilocycle signal (wave A shown in FIG. 2b) to the base of transistor 11, causing the transistor to conduct during the positive portions of the signal shown in waveform A. As the transistor conducts during each positive portion of the 155 kilocycle signal, current flows (as shown by waveform B in FIG. 2b) through the infrared light-emitting diode causing it to emit infrared energy at a 155 kilocycle rate.

Figure 3:
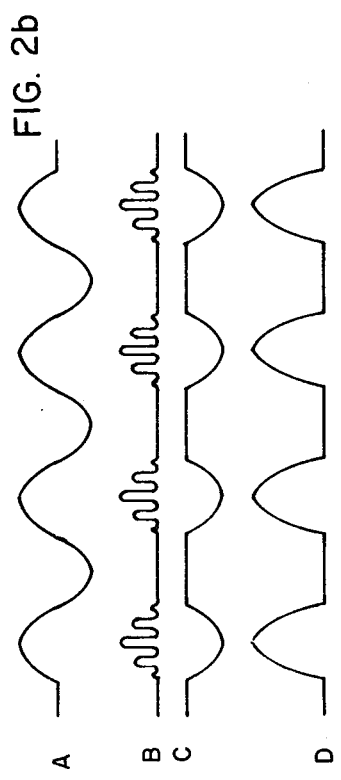
FIG. 3 is a schematic and block diagram of the gate and detector illustrated in FIG. 1.

The infrared energy emitted by diode 15 causes the phototransistor 19 to conduct producing a negative going signal at a 155 kilocycle rate (shown by waveform c in FIG. 3b) at its collector. This signal is inverted and amplified by inverter 27 producing a positive going signal at the 155 kilocycle rate (shown by waveform D in FIG. 3b) at the output of the receiver device 16.

Returning now to FIG. 1, the 155 kilocycle signal from the output of the radiant energy receiver 16a is applied to a first input 18a of a signal gate 20a. The signal gate 20a has a second input 22a, which is connected to the output 24a of a detector 26a. This detector 26a has its input 28a connected to the output 30a of the signal gate 20a. The common connection between the output of the signal gate 20a and the input of detector 26a is connected to the output terminal 32b of a signal receiver 34b situated in control block 2.

The signal gate 20a is operative such that if an input signal is concurrently present at the input 18a with an enable signal at the input 22a, the signal appearing at the input 18a is reproduced at the output terminal 30a. This is the well known AND gate function.

There are many such gates known to those skilled in this art. For example, referring briefly to FIG. 3, there is shown a signal gate circuit which is suitable for use in the practice of the present invention. This particular gate is described in detail in the previously referenced U.S. Pat. No. 3,600,604 for George M. Thorne-Booth entitled Failsafe Logic Gates that was filed Dec. 3, 1968. The signal gate 20 shown in FIG. 3 includes a transistor 36 and a transformer 38. The first input 18 of the signal gate 20 is connected to the base electrode of the transistor 36 through a level shifting network 40. The emitter of the transistor 36 is connected to ground. The collector of the transistor 36 is connected to the output 24 of detector 26 through the primary winding of the transformer 38. Operating potential for the transistor 36 is supplied from the detector 26 whenever an input signal is applied to the input 28 of the detector. Initially, assume that a momentary a.c. signal on the order of 50 milliseconds in width is applied to the terminal 30. This signal is detected by the detector 24 which provides a negative signal to the collector of the transistor 36, through the primary winding of transformer 38, thereby supplying operating potential for the transistor 36. Concurrent therewith, an alternating signal is applied to the input terminal 18, for example a 155 kilocycle signal. The latter signal is reproduced across the secondary winding of the transformer 38, and the detector 26 detects the 155 kilocycle signal and applies a negative potential to the collector of transistor 36 for maintaining operating potential for the transistor 36 as long as this input signal is applied to the input 18. The signal gate 20, therefore operates as a signal latch device. That is, once a signal is momentarily applied to the input 28 or detector 26, a signal is continuously produced at output 30, as long as this input signal is applied to input 18. The rectified signal appearing at the input terminal 22 may also be used as a control signal which shall be made clear from the explanation to follow.

Returning now to FIG. 1, consider first that there is no vehicle 4 in any of the three illustrated track sections. Each of the gate circuits 20 is disabled as there is no signal applied to the input 28 of the detector 26 associated therewith, and therefore there is no input signal applied to the input 22 of each such gate, for the purpose of supplying operating potential. Each of the signal receivers 34 may include a suitable source (not shown) for temporarily applying an a.c. signal to the input 28 of each detector 26 to make the system initially operative. As was stated above, this latter signal may have a duration on the order of 50 milliseconds. Once such a signal has been detected by the detector 26 and been applied to the input 22 of the gate 20, each gate then produces a 155 kilocycle signal at its output as there is a 155 kilocycle wave at input 18 since each radiant energy receiver 16 is now receiving energy from its associated radiant energy transmitter 12, while no vehicle 4 is blocking this energy transmission. The radiant energy received by respective receivers 16a and 16b is illustrated by waveforms A and E, respectively, of FIG. 4. The waves are generally illustrated as sine waves for ease of illustration, however in practice they more closely take the form of the waveform B shown in FIG. 2b.

Consider that a vehicle 4 is entering control block 1 through boundary 6 from previous control block 0 (not shown). At a time $t_o$ (see waveform A, FIG. 4) the vehicle 4 blocks the transmission of radiant energy to the receiver 16a. The output signal from signal gate 20a at time $t_0$ (waveform B, FIG. 4) drops to zero. This in turn results in the output signal from detector 26a returning to zero (waveform C, FIG. 4) which removes the operating potential from the input 22a of gate 20a, and the control line 42a.

Consider for a moment, the function of the output signal from the detectors as applied to the control lines 42. The output signals from detectors 26a and 26b are coupled through control lines 42a and 42b, respectively, to the speed encoder and transmitter 44 in block 0 (not shown). The speed encoder and transmitter operates on these two signals to derive a vehicle speed control signal which is transmitted to a vehicle already positioned within or entering control block 0. Any known vehicle speed encoder and transmitter may be utilized in the practice of the present invention. For example, the previously referenced U.S. Pat. No. 3,551,889 illustrates a suitable vehicle speed encoding system which may be used as the speed encoder and transmitter 44. If there is a signal present on each of lines 42a and 42b this indicates that both control blocks 1 and 2 are unoccupied by another vehicle. The absence of a signal on one of lines 42a and 42b, indicates that there is another vehicle positioned in the control block which the latter one line is coupled from. That is, if there is another vehicle in control block 1 there is no signal from detector 26a on line 42a, or if there is another vehicle in control block 2 there is no signal from detector 26b on line 42b. Thusly, for example, if there is an indication of no vehicle located in either of control blocks 1 or 2, the vehicle located in block 0 could be given a maximum desired speed command, if another vehicle is in control block 2 and there is no vehicle in control block 1 the vehicle in control block 0 could be given in one-half desired speed command; if there is another vehicle in control block 1, the vehicle in control block 0 would be given a zero desired speed command.

The number of inputs to each speed encoder and transmitter of a given control block is dependent upon the length of that particular block. If the control block length is equivalent to the distance it takes a vehicle to be stopped by available brake effort of the vehicle, there need be only the signal from the detector of the succeeding control block applied to the transmitter and encoder of that given control block. If the available braking distance of the vehicle is two control block lengths, the transmitter and speed encoder for the given block containing the vehicle should receive signals from the detectors of the two succeeding control blocks.

In the illustrative embodiment shown in FIG. 1, the available and reasonable braking distance is assumed to be two block lengths. Therefore, control block 0 (not shown) receives signals from the detectors in control blocks 1 and 2 through lines 42a and 42b, respectively. The speed encoder in control block 1 receives signals from the detectors in control blocks 2 and 3 through lines 42b and 42c, respectively, and so on for the operation of succeeding control blocks.

Figure 4:
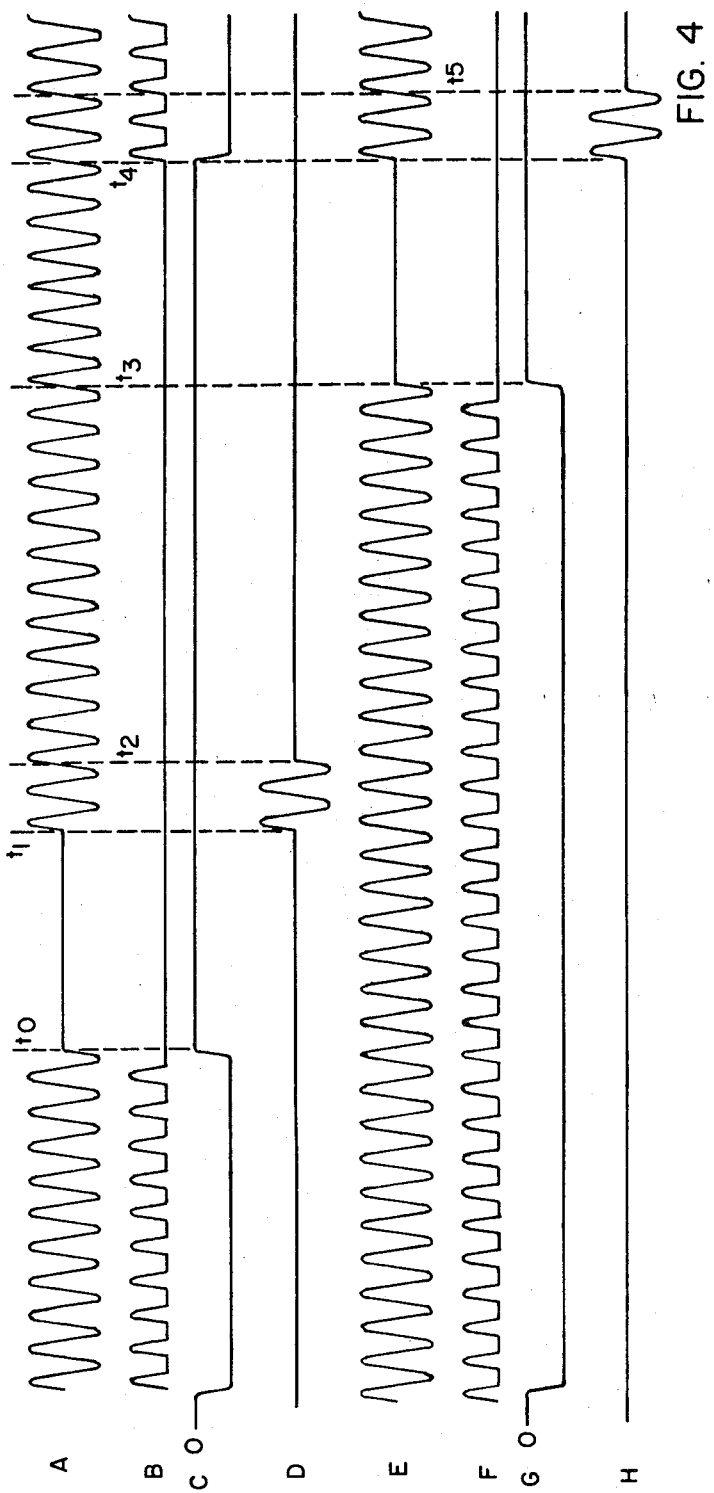
FIG. 4 is a waveform relationship illustration helpful in the understanding of FIG. 1.

As the vehicle continues through control block 1, the end of the vehicle finally passes the receiver 16a, and radiant energy is thereafter no longer obstructed by the vehicle and is again received by receiver 16a at a time $t_1$ (waveform A, FIG. 4). The signal gate 20a (waveform B, FIG. 4), however, produces no output as the output of detector 26a (waveform C, FIG. 4) is not providing operating potential to input 22a of signal gate 20a. This condition persists until signal receiver 34b of control block 2, receives a radio signal from cooperative transmitter 42 carried by the vehicle 4, indicating that the rear end of the vehicle is now in control block 2 and is, therefore, no longer in control block 1. This is to be explained in greater detail subsequently.

Substantially at the time $t_1$ shown in FIG. 4, the signal receiver 34a begins to receive a radio transmission from the transmitter 42 in the vehicle 4 as the rear end of the vehicle enters control block 1 (waveform D, FIG. 4). The receiver 34a senses the signal momentarily, on the order of 50 milliseconds, until a time $t_2$ (waveform D, FIG. 4). The latter signal is coupled to the input 28 of the detector 26 in control block 0 (not shown). This signal, as was explained above, permits the detector 26 in control block 0 to provide operating potential for the gate 20 in control block 0. This signal informs the signal gate 20 that a vehicle is now no longer located in control block 0.

The vehicle 4 continues through control block 1 moving from left to right as shown in FIG. 1, and at a time $t_3$ the front end of the vehicle enters control block 2 blocking transmission of radiant energy to receiver 16b (waveform E, FIG. 4). The output of signal gate 20b also drops low at $t_3$ (waveform F, FIG. 4) and the output of detector 26b returns to zero (waveform G, FIG. 4). The signal from the output of detector 26b is coupled through line 42b to the output 48a of speed encoder and transmitter 44a for control block 1, informing the latter speed encoder and transmitter 44a that block 2 is now occupied. Blocks 1 and 2 are now each in an occupied condition, as is indicated by the zero output of signal gate 20a (waveform B, at time $t_3$, FIG. 4) and the zero output of signal gate 20b (waveform F, at time $t_3$, FIG. 4).

As the vehicle continues to proceed from control block 1 into control block 2, the end of the vehicle finally passes receiver 16b in control block 2 and receiver 16b, which is now unobstructed again receives radiant energy at time $t_4$ (waveform E, FIG. 4). The output of signal gate 20b (waveform F, FIG. 4) remains at zero, and there is no enable signal provided to the input of detector 26b from signal receiver 34c in control block 3, as the rear end of the vehicle has not yet entered control block 3.

Substantially between time $t_4$ and $t_5$, the signal receiver 34b receives the momentary transmission from vehicle 4 (waveform H, FIG. 4) as the end of the vehicle arrives in block 2. This signal is coupled to the input 28a of detector 26a in control block 1, informing control block 1 that the vehicle is no longer located in control block 1. The output of detector 26a goes negative at this time $t_4$ (waveform C, FIG. 4) providing operating potential to input 22a of signal gate 20a. The signal gate 20a becomes operative as input 18a is receiving radiant energy from receiver 16a, as previously explained. The output signal from detector 26a is also coupled through line 42a to the speed encoder and transmitter in control block 0 (not shown) informing it that control block 1 is now empty. This signal, therefore, is a control signal for the transmitter and speed encoder, such that speed control signals may again be generated to determine vehicle operation in control block 0.

The present control system has been described for entry and exit of a vehicle relative to control block 1, and entry of a vehicle into control block 2 and past the boundary between control blocks 1 and 2. The general control operation of the present system follows this same pattern as the vehicle travels from control block 2 to control block 3 and so forth.

It is seen, therefore, that the signal gate 20 in each control block acts as a memory. Once a vehicle enters a given control block, the signal is removed from input 18 of the signal gate causing the output to go to zero which in turn causes the input 22 to go to zero via the detector 26. The gate now knows a vehicle has entered the control block in which it is situated. Even if the input 18 subsequently receives a signal, the gate doesn't produce an output until it receives an enable signal, to input 22, via detector 26, from the signal receiver in the succeeding control block telling the gate that the vehicle is now in the succeeding control block. The signal from the detector of that same control block is also used to inform the preceding control block that the former block in which the detector is located no longer contains a vehicle.

In other words, the gate in a given block is responsive to the absence of a vehicle entering that same given block concurrent with the sensing of the end of a vehicle entering the succeeding control block, for generating a control signal for controlling the movement operation of a vehicle in or entering at least the preceding control block.

I claim as my invention:

1. In a vehicle control system wherein the vehicle track is divided into a predetermined number of control sections with a defined boundary between adjacent sections, and each vehicle traversing the track carries a signal transmitter, the combination comprising:
    radiant energy transmitting means in each section situated adjacent each boundary on one side of said track;
    radiant energy receiving means in each section situated adjacent each boundary on the other side of the track for sensing radiant energy from the radiant energy transmitting means on the one side of the track during the absence of a vehicle adjacent the boundary, and for not sensing radiant energy when a train is present adjacent the boundary;
    signal receiving means in each section for sensing a signal transmitted by a vehicle as said vehicle is passing said signal receiving means, for providing an enable signal;
    a gate means in each section having first and second inputs and an output at which a control signal is produced in response to a first signal, indicative of radiant energy being sensed by said radiant energy receiving means in a given section, being applied to said first input concurrent with an enable signal, from said signal receiving means in the section succeeding said given section, being applied to the second input; and
    means for generating speed signals for a vehicle in at least the section preceding said given section in response to the provision of said control signal.

2. The combination claimed in claim 1 wherein said radiant energy comprises infrared energy.

3. The combination claimed in claim 1 including a detector connected between the output and second input of said gate.

4. The combination claimed in claim 1 wherein said gate means comprises a gate which includes:
    a first input to which a signal is applied when radiant energy is sensed;
    a second input to which said enable signal is applied;
    a transformer having primary and secondary windings, the secondary winding providing an output for said gate with one end of said primary winding being connected to said second input; and
    a transistor having a base, emitter and collector electrodes, the base electrode being connected to said first input, and one of said emitter and collector electrodes being connected to the other end of said primary winding of said transformer.

5. A method of providing vehicle speed signals in a vehicle control system wherein the vehicle track is divided into a predetermined number of control sections with a defined boundary between adjacent sections, and each vehicle traversing the track carries a signal transmitter, said method comprising the steps of:
    transmitting radiant energy across the track in each section adjacent the boundary;
    sensing the transmission of said radiant energy in a given section during the times a vehicle is not present in said given section;
    providing an enable signal in each section in response to sensing a signal transmitted from the signal transmitter on a vehicle;
    producing a control signal at the output of a gate means in a given section in response to the application of a signal, indicative of sensing radiant energy in said given section, being applied to a first input of said gate means concurrent with the application of said enable signal from the succeeding section to a second input of said gate means; and
    providing said vehicle speed signal to a vehicle in at least the section preceding said given section in response to the provision of said control signal.

* * * * *